(12) United States Patent
Tokutsu

(10) Patent No.: US 6,479,993 B1
(45) Date of Patent: Nov. 12, 2002

(54) METHOD OF DETECTING FOREIGN MATTER AND APPARATUS THEREFOR

(75) Inventor: Harunori Tokutsu, Kurita-gun (JP)

(73) Assignee: Ishida Co., Ltd., Kyoto (JP)

( * ) Notice: Subject to any disclaimer, the term of this patent is extended or adjusted under 35 U.S.C. 154(b) by 150 days.

(21) Appl. No.: 09/604,257

(22) Filed: Jun. 27, 2000

(30) Foreign Application Priority Data

Jun. 30, 1999 (JP) ............................................ 11-185412

(51) Int. Cl.[7] .............................................. G01N 27/72
(52) U.S. Cl. ........................ 324/233; 324/202; 324/239
(58) Field of Search .............................. 324/233, 202, 324/239, 241, 243, 225, 226, 204; 209/567, 570, 571; 702/38, 106

(56) References Cited

U.S. PATENT DOCUMENTS

| 4,663,612 A | 5/1987 | Mejia et al. ................ 340/572 |
| 4,949,037 A | * 8/1990 | Abe ............................ 324/233 |
| 5,078,252 A | * 1/1992 | Furuya et al. ............... 194/318 |

FOREIGN PATENT DOCUMENTS

| EP | 0 353 035 A | 1/1990 |
| EP | 0 949 514 A | 10/1999 |
| JP | 6-160542 A | 6/1994 |

* cited by examiner

Primary Examiner—Edward Lefkowitz
Assistant Examiner—Reena Aurora
(74) Attorney, Agent, or Firm—Staas & Halsey LLP

(57) ABSTRACT

An apparatus for detecting the presence or absence of foreign matter in a product is provided which includes a reaction signal generating circuit 2 for outputting a reaction signal associated with the product by detecting a change in pattern of distribution of magnetic fluxes when the product P is passed through an alternating magnetic field; a determining circuit 10 for comparing a value of the reaction signal at a predetermined phase point p1 with a threshold value SH to thereby determine the presence or absence of the foreign matter in the product; and a sensitivity adjusting circuit 12A for adjusting a sensitivity of the reaction signal generating circuit 2 so that the value of a first test reaction signal A at the predetermined phase point p1, which is obtained when a product P added with foreign matter of a minimum size to be detected is passed through the alternating magnetic field, attains a desired level relative to the threshold value SH. Thereby, the foreign matter of a predetermined size can be detected assuredly.

5 Claims, 6 Drawing Sheets

METHOD OF DETECTING FOREIGN MATTER AND APPARATUS THEREFOR

BACKGROUND OF THE INVENTION

1. Field of the Invention

The present invention relates to a method of and an apparatus for detecting the presence or absence of foreign matter such as, for example, metallic pieces in products which have been packaged or have not yet been packaged (hereinafter referred to as merely "product").

2. Description of the Prior Art

The prior art apparatus for detecting the presence or absence of foreign matter includes a transport conveyors for successively transporting products to be inspected from one station towards another station past an inspecting station, and two detecting coils disposed at the inspecting station in a side-by-side fashion along the direction of transport of the product for producing an electromotive force as each product passes through the inspecting station. The presence or absence of foreign matter such as metallic pieces in the products is detected by differentially amplifying the electromotive force produced by the detecting coils during the passage of the product past the inspecting station, and detecting the phase of the electromotive force to provide a detected phase signal (hereinafter referred to as a "reaction signal"). This prior art foreign matter detecting apparatus is so designed and so configured as to utilizes the principle in which the value of a maximum dip point (the point of the lowest voltage) and the phase of this maximum dip point differ depending on whether the product contains no metallic piece or whether the product contains metallic pieces.

The method of setting the point of phase determination and adjusting the detecting sensitivity employed in the prior art foreign matter detecting apparatus will be discussed in detail with reference to FIG. 7 showing a phase output characteristic representative of the level of the reaction signal with respect to the phase.

At the outset, while a sample product free from the foreign matter is transported by the transport conveyor past the inspecting station, the phase of the maximum dip point d of the reaction signal B1 produced as a result of the passage of the sample product past the inspecting station is detected. The phase so detected is preset as a phase determination point p, that is, predetermined phase point at which the level of the reaction signal is detected for the purpose of determining the presence or absence of the foreign matter. Then, while the same sample product is again transported by the transport conveyor past the inspecting station, the value of the reaction signal B2, produced as a result of the passage of the same sample product past the inspecting station, at the phase determination point preset in the manner described above is detected, wherefore the sensitivity of a detector can be automatically adjusted to a value effective to detect the reaction signal so that the value of the reaction signal B2 at the phase determination point p may effectively attain a value lower than a threshold value SH that is utilized to determine the presence or absence of the foreign matter.

However, the prior art method of adjusting the detecting sensitivity is such that the detecting sensitivity is merely adjusted for the purpose of avoiding the possibility that the product free from the foreign matter is erroneously determined as containing the foreign matter, and the minimum size of the foreign matter that can be detected has not been disclosed. For this reason, the minimum size of the foreign matter that can be detected varies depending on types of products to be inspected and, hence, the criterion warranted by a foreign matter detecting machine may vary.

SUMMARY OF THE INVENTION

In view of the foregoing, the present invention has been devised to substantially eliminate the above discussed problem inherent in the prior art foreign matter detecting apparatus and is intended to provide an improved foreign matter detecting apparatus in which the detecting sensitivity can be easily adjusted to a value effective to detect the foreign matter of a desired size.

In order to accomplish the foregoing object, the present invention provides a method of detecting the presence or absence of foreign matter in a product by using a reaction signal generating circuit for generating, while the product is passed through an alternating magnetic field, a reaction signal associated with the product based on the magnetic field influenced by the product. This method includes the steps of obtaining a first test reaction signal by passing a product, added with foreign matter of a minimum size to be detected, through the alternating magnetic field; and adjusting a sensitivity of the reaction signal generating circuit so that the value of the first test reaction signal at a predetermined phase point attains a desired level relative to a predetermined threshold value.

According to the method described above, the sensitivity of the reaction signal generating circuit can be so adjusted that the reaction signal associated with the product added with the foreign matter of the minimum size to be detected will not lower below the threshold value, but the reaction signal associated with the product added with no foreign matter will lower below the threshold value and, therefore, the presence of the foreign matter of the minimum size to be detected can be detected assuredly.

The present invention also provides an apparatus for detecting the presence or absence of foreign matter in a product, which includes a reaction signal generating circuit for outputting a reaction signal associated with the product by detecting a change in pattern of distribution of magnetic fluxes when the product is passed through an alternating magnetic field; a determining circuit for comparing a value of the reaction signal at a predetermined phase point with a threshold value to thereby determine the presence or absence of the foreign matter in the product; and a sensitivity adjusting means for adjusting a sensitivity of the reaction signal generating circuit so that the value of a first test reaction signal at the predetermined phase point, which is obtained when a product added with foreign matter of a minimum size to be detected is passed through the alternating magnetic field, attains a desired level relative to the threshold value.

According to the structure described above, since the sensitivity of the reaction signal generating circuit can be so adjusted that the reaction signal associated with the product added with the foreign matter of the minimum size to be detected will not lower below the threshold value, but the reaction signal associated with the product added with no foreign matter will lower below the threshold value, the presence of the foreign matter of the minimum size to be detected can be detected assuredly.

In a preferred embodiment of the present invention, in order to automatically set the predetermined phase point in the determining circuit, the phase at which the value of the second test reaction signal obtained when the product containing no foreign matter is passed through the alternating magnetic field attains a minimum value is set at the predetermined phase point or, alternatively, the phase at which the difference in level between the first and second reaction signals is maximized is set at the predetermined phase point.

In another preferred embodiment of the present invention, an amplifier may be employed in the foreign matter detecting apparatus for amplifying an output from the reaction signal generating circuit and outputting the reaction signal, in which case the sensitivity adjusting means is operable to adjust an amplification factor of the amplifier.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Hereinafter, preferred embodiments of the present invention will be described in details with reference to the accompanying drawings.

Figure 1:
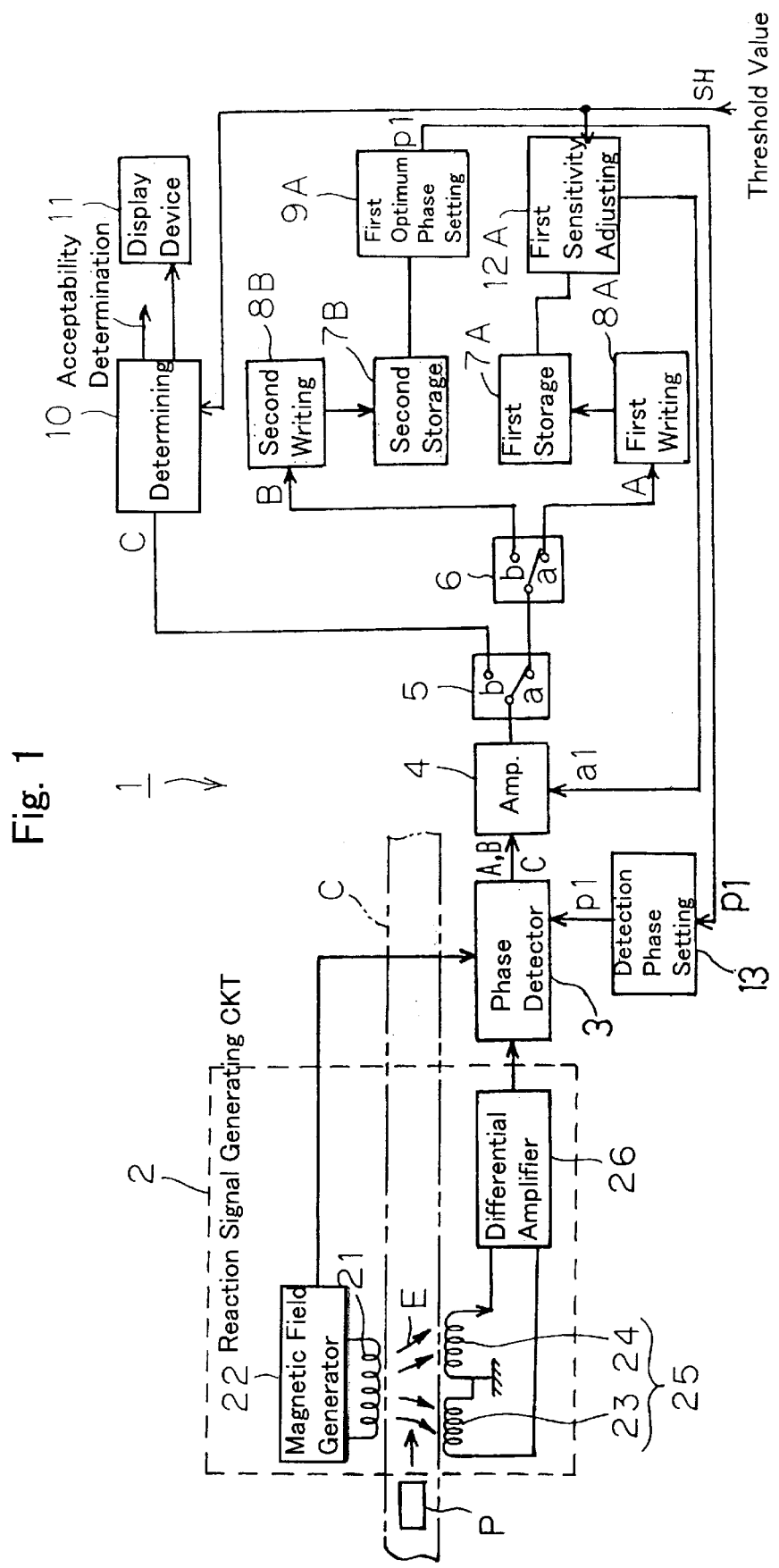
FIG. 1 is a circuit block diagram showing a foreign matter detecting apparatus according to a first preferred embodiment of the present invention.

In FIG. 1, the structure of a foreign matter detecting apparatus according to a first preferred embodiment of the present invention is shown. As shown therein, the foreign matter detecting apparatus generally identified by 1 comprises a reaction signal generating circuit 2 for applying an alternating magnetic field E across the path of movement of a product P transported by a transport conveyor C and for generating a reaction signal associated with the product P then traversing the alternating magnetic field E.

The foreign matter detecting apparatus shown in FIG. 1 also comprises a phase detector 3 for outputting a detected phase signal descriptive of the phase of the reaction signal produced by the reaction signal generating circuit 2; an amplifier 4 for amplifying the detected phase signal; a first switch 5 for selectively switching over to one of an operative mode, in which detection of the presence or absence of foreign matter in the product is carried out with respect to the detected phase signal, and a test mode as will be described later; a second switch 6 for selectively switching over to one of a first detected phase signal A associated with the product containing predetermined foreign matter during the test mode and a second detected phase signal B associated with the product containing no foreign matter; first and second storage means 7A and 7B; a first writing means 8A for storing a phase versus output characteristic of the first detected phase signal A in the first storage means 7A; a second writing means 8B for storing a phase versus output characteristic of the second detected phase signal in the second storage means 7B; a first optimum phase setting means 9A for automatically setting a phase determination point p1 that is used as a criterion for determination during the operative mode; a detection phase setting means 13 for setting a detection phase for the phase detector 3 so that the phase detector 3 can perform a phase detecting operation at the preset phase determination point p1; a first sensitivity adjusting means 12A for automatically setting a detecting sensitivity; a determining means 10 for determining the acceptability of the product (i.e., the presence or absence of foreign matter in the product) based on threshold value SH in reference to the level of the reaction signal associated with the product at the phase determination point pi during the operative mode; and a display device 11 for providing visual indications of various pieces of information.

The reaction signal generating circuit 2 referred to above comprises a magnetic field generator 22 for supplying an electric exciting current to a transmitter coil 21 to cause the latter to generate an alternating magnetic field E; a magnetic sensor 25 including a pair of series-connected receiver coils 23 and 24 each capable of receiving through a respective an equal amount of magnetic fluxes of the alternating magnetic field E generated from the transmitter coil 21; and a differential amplifier 26 to which voltage signals induced by the paired receiver coils 23 and 24 is supplied from the magnetic sensor 25.

The magnetic sensor 25 is so operable that when the product P containing foreign matter traverses the alternating magnetic field E produced in the reaction signal generating circuit 2, a difference occurs between respective voltages that are induced by the paired receiver coils 23 and 24 as a result of the state of imbalance developed in the magnetic fluxes crossing over between the paired receiver coils 23 and 24. A voltage difference signal, that is, a signal descriptive of the difference in voltage is inputted to and amplified by the differential amplifier 26, and the amplified voltage difference signal is in turn supplied to the phase detector 3 where the phase of the voltage difference signal is detected. The phase detector 3 subsequently provides a detected phase signal, that is, a signal descriptive of the phase of the voltage difference signal detected by the phase detector 3 is amplified by the amplifier 4 and is then outputted to the first switch 5.

Figure 2:
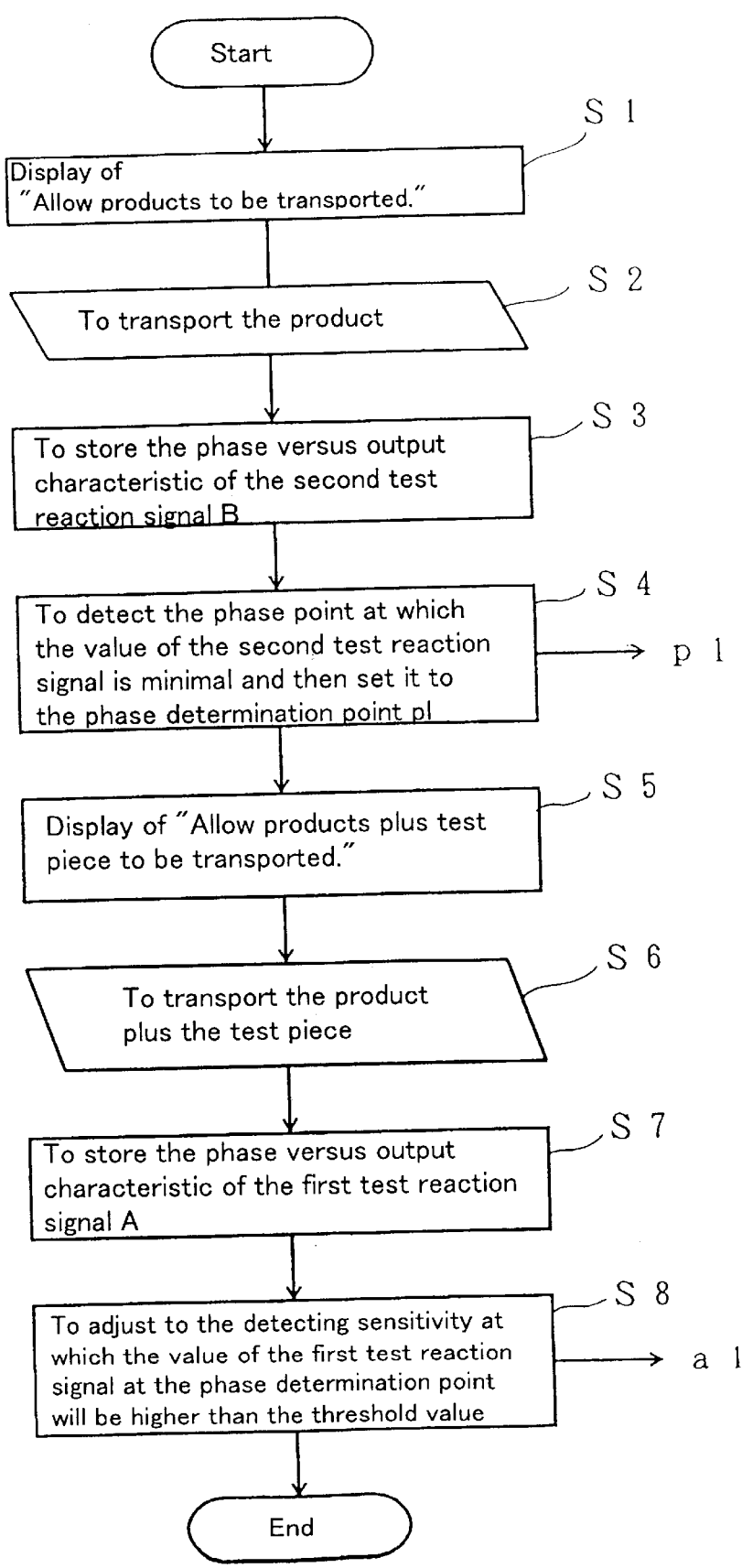
FIG. 2 is a flowchart showing the setting of a phase determination point performed by a first optimum phase setting means and, also, the sequence of adjustment of a detecting sensitivity of a first sensitivity adjusting means, both employed in the first preferred embodiment of the present invention.

Hereinafter, the operation for setting the "phase determination point" p1 which represents a predetermined phase point at which the level (output value) of the reaction signal for determining the presence or absence of foreign matter contained in the product P in accordance with the illustrated embodiment of the present invention will be described with particular reference to the flowchart shown in FIG. 2.

Upon initiation of the setting operation, a message "Allow products to be transported." is visually displayed on the display means 11 at step S1. Viewing the display means 11, the operator has to switch the second switch 6 over to a contact b at step S2 to allow a product P, with no foreign matter added thereto, to be transported by the conveyor C. Then, the second writing means 8B causes the phase versus output characteristic of the second test reaction signal B to be stored in the second storage means 7B at step S3.

Thereafter, the first optimum phase setting means 9A detects at step S4 the phase at which the output value from the second storage means 7B is minimum and then sets this detected phase in the phase detector 3 as the "phase determination point" p1. At subsequent step S5, a message "Allow products plus a test piece to be transported." is displayed on the display means 11. In this way, the operator is visually advised by the display device 11 as to whether or not the product to be transported contains the test piece (that is, foreign matter) and, therefore, an erroneous work would hardly occur. After the operator has been so advised, the operator has to switch the first switch 5 over to a contact a and the second switch 6 over to a contact a to thereby allow the product P, added with the foreign matter (test piece) of a preselected material and having a minimum size to be detected, to be transported by the conveyor C at step S6. Subsequently, at step S7, the first writing means 8A causes the first test reaction signal A at the phase determination point p1 to be stored in the first storage means 7A.

Then, at step S8, the first sensitivity adjusting means 12A reads out the first test reaction signal A from the first storage means 7A and adjusts the amplification factor of the amplifier 4 to a value a1 so that the value of the first test reaction signal A will assuredly attain a value higher than the predetermined threshold value SH. By way of example, where a reaction signal of 3.0 v, which is somewhat higher than the predetermined threshold value SH that is equal to 2.8 v, is desired to be obtained while it is assumed that the value of the first test reaction signal A is 1.0 v, the amplification factor of the amplifier 4 is increased three times, that is, 3.0/1.0.

Figure 3:
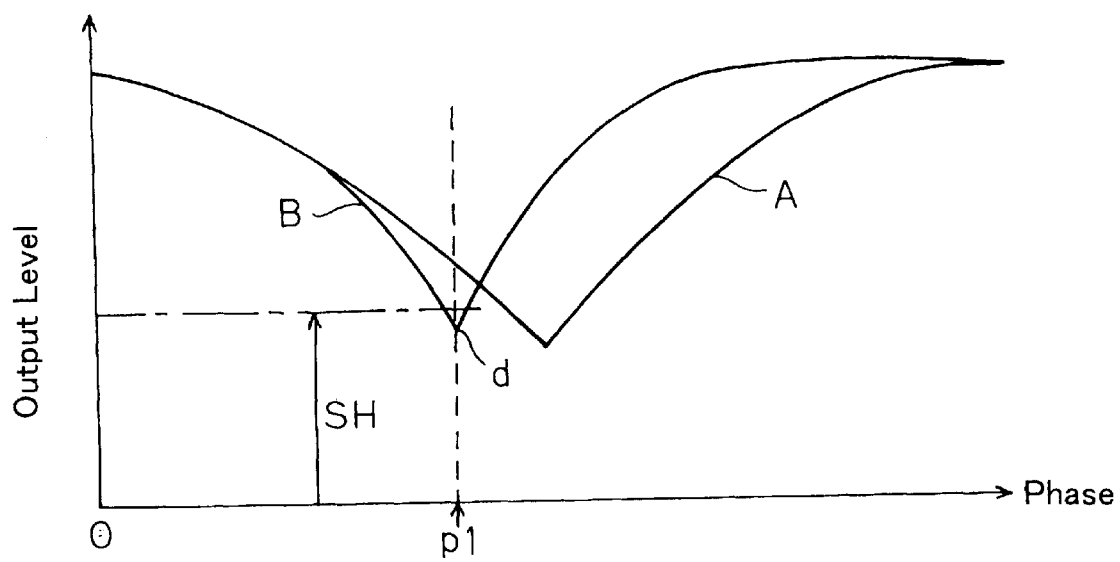
FIG. 3 is a diagram showing the phase versus output characteristic of first and second test reaction signals used for explanation of the phase determination point and the threshold value in the practice of the first preferred embodiment of the present invention.

FIG. 3 illustrates the relationship among the phase determination point p1 set in the manner described above, the threshold value SH and the respective phase versus output characteristics of the first and second test reaction signals.

After the phase determination point p1 has been set in the manner described above and the detecting sensitivity of the reaction signal detecting circuit 2 shown in FIG. 1 has been adjusted in the manner described above, the operator has to switch the first switch 5 over to the contact b to thereby initiate the detecting operation with respect to an actual product P. At this time, the phase detector 3 provides the amplifier 4 with only the reaction signal C at the phase determination point p1, and the reaction signal C amplified by the amplifier 4 to the amplification factor a1 is subsequently supplied to the determining means 10. The determining means 10 compares the value of the reaction signal C, inputted thereto, with the threshold value SH and determines that the product P is acceptable (free of the foreign matter) if the value of the reaction signal C is lower than the threshold value SH, but the product P is unacceptable (containing foreign matter) if the value of the reaction signal C is not lower than the threshold value SH. This result of comparison performed by the determining means 10 is displayed on the display device 11.

According to the foregoing first preferred embodiment of the present invention, merely by transporting the product added with no foreign matter and the product added with the foreign matter each one at a time by means of the conveyor C, the phase determination point p1 and the amplification factor a1 of the amplifier 4 that determines the detecting sensitivity of the reaction signal detecting circuit 2 are automatically set and, therefore, a job of setting the criterion for determination can advantageously be lessened considerably.

Also, according to the first preferred embodiment of the present invention described hereinbefore, even though the product containing foreign matter of a size smaller than that of the test piece can be determined as containing the foreign matter, there is no possibility that the product containing foreign matter of a size larger than that of the test piece can be determined as containing no foreign matter, and therefore, the presence of the foreign matter of a size larger than that of the test piece can be assuredly detected. Accordingly, the capability of the foreign matter detecting apparatus can be positively expressed in terms of the minimum size of the test piece that can be detected thereby.

It is to be noted that in the practice of the foregoing preferred embodiment of the present invention, the use of the first sensitivity adjusting means 12A may be dispensed with and, instead, the amplifier 4 may be employed in the form of an amplifier having its sensitivity that can be adjusted manually.

Figure 4:
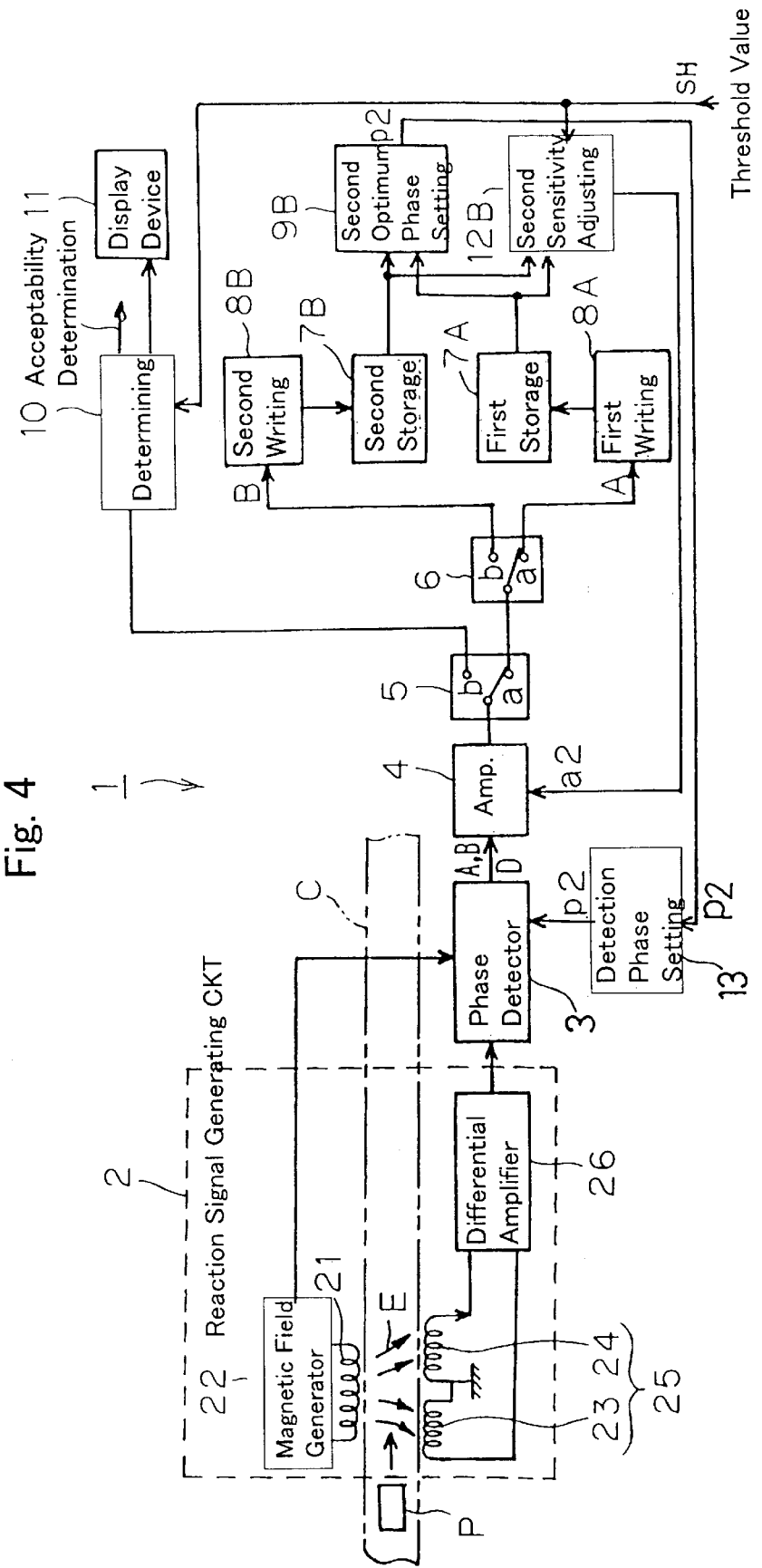
FIG. 4 is a circuit block diagram showing the foreign matter detecting apparatus according to a second preferred embodiment of the present invention.

FIG. 4 illustrates the structure of the foreign matter detecting apparatus according to a second preferred embodiment of the present invention. In this figure, component parts similar to those shown in FIG. 1 are designated by like reference numerals used therein. The foreign matter detecting apparatus shown in FIG. 4 comprises a second optimum phase setting means 9B and a second sensitivity adjusting means 12B. The second optimum phase setting means 9B is operable to set as a predetermined phase point the phase at which the difference in level between the first test reaction signal A and the second test reaction signal B that is generated when a product free of foreign matter has been traversed across the alternating magnetic field B attains a maximum value. The second sensitivity adjusting means 12B is operable to adjust the sensitivity of the reaction signal generating circuit 2 by changing the amplification factor of the amplifier 4 from the value of the reaction signal at the phase point set in the manner described above.

Only portion of the second embodiment of the present invention that differs from the foregoing first embodiment of the present invention will now be discussed.

The second embodiment of the present invention differs from the first embodiment of the present invention in respect of the method of setting the phase determination point and the adjustment of the detecting sensitivity of the reaction signal detecting circuit 2. More specifically, the phase determination point at step S7 in the flowchart shown in FIG. 2 is so modified that as shown in the flowchart in FIG. 5 the phase determination point can be set at a point at which the first test reaction signal A can have a level higher than that of the second test reaction signal B and also at which the difference in level between the first and second test reaction signals A and B can be maximized.

Figure 5:
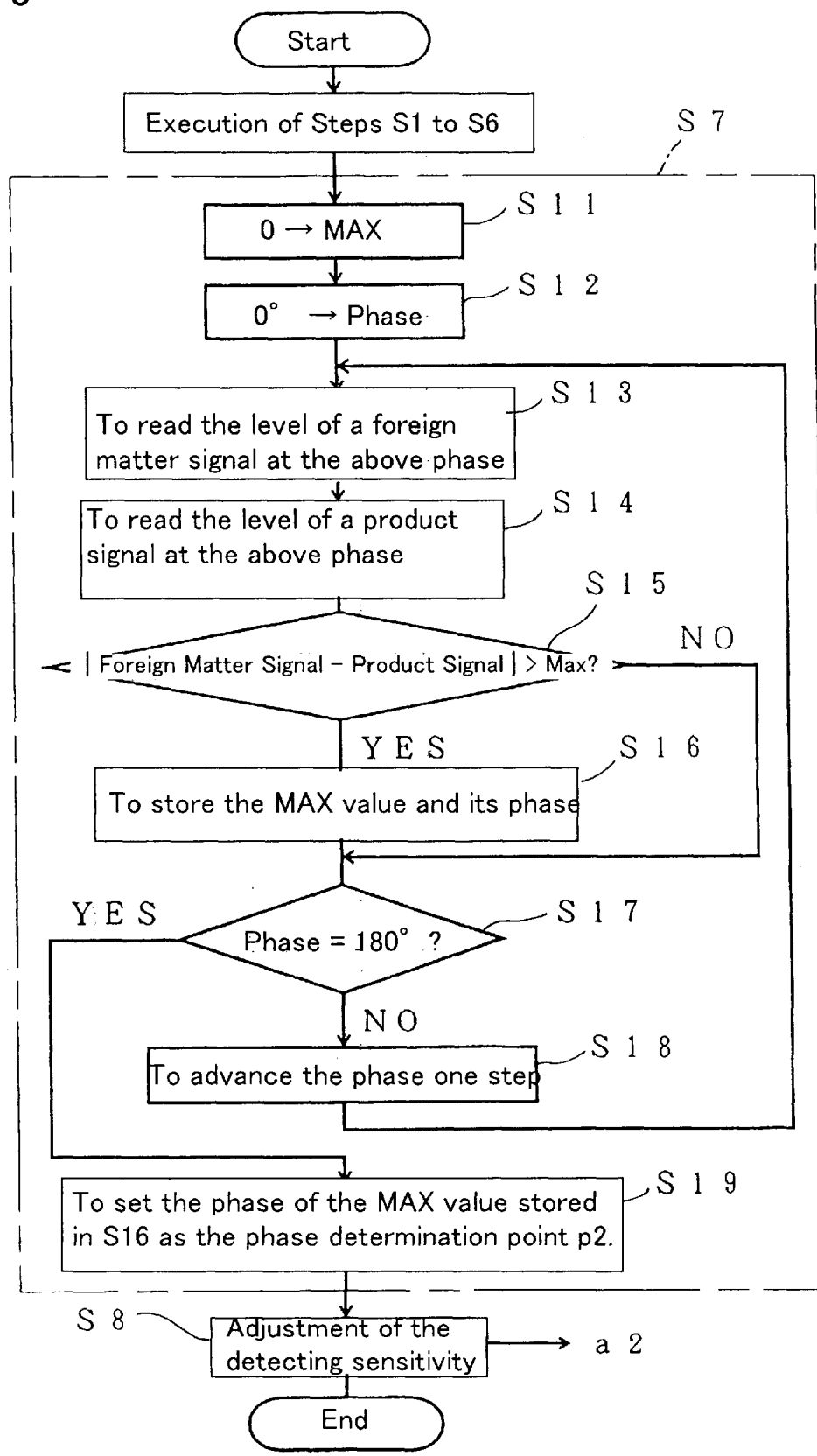
FIG. 5 is a flowchart showing the setting of the phase determination point performed by a second optimum phase setting means and, also, the sequence of adjustment of the detecting sensitivity of a second sensitivity adjusting means, both employed in the second preferred embodiment of the present invention.

Referring to the flowchart shown in FIG. 5, at step S11 the second optimum phase setting means 9B resets to zero the signal indicative of the difference in level between the first and second reaction signals A and B that has been stored, followed by step S12 at which the phase is reset to 0°. Then at step S13, the level value of the first test reaction signal A of which the phase is 0° (signifying that respective phases of voltages of the transmitter coil 21 and the paired receiver coils 23 and 24 are the same) is read out from the first storage means 7A, followed by step S14 at which the level value of the second test reaction signal B, of which the phase is 0°, is read out from the second storage means 7B. Thereafter, at step S15 the difference in level between the first and second test reaction signals A and B is calculated, followed by step S16 at which the phase thereof and the level difference are stored temporarily. The program flow then proceeds to a decision step S17 at which decision is made to determine if the phase is 180°. Should a result of decision at step S17 indicate that the phase is not 180°, the program flow goes to step S18 at which the phase is advanced one step, and then returns to step S13. At successive steps S13 and S14, the respective level values of the first and second test reaction signals A and B at the advanced phase are read out, followed by calculation at step S15 of the difference in level between the first and second test reaction signals A and B, which difference is subsequently compared with the level difference stored. At step S16 one of the level differences that is larger than the stored level difference remains left. The program flow from step S13 back to step S13 via step S18 is repeated until the phase becomes 180°.

When at step S17 the phase attains 180°, step S19 takes place at which the phase of the maximum level difference stored at step S16 is set as a "phase determination point" p2. Then, the second sensitivity adjusting means 12B sets the amplification factor a2 of the amplifier 4 at step S8 to such a value that the value of the first test reaction signal A at the phase determination point p2 gives rise to a detecting sensitivity that is assuredly greater than the threshold value.

Figure 6:
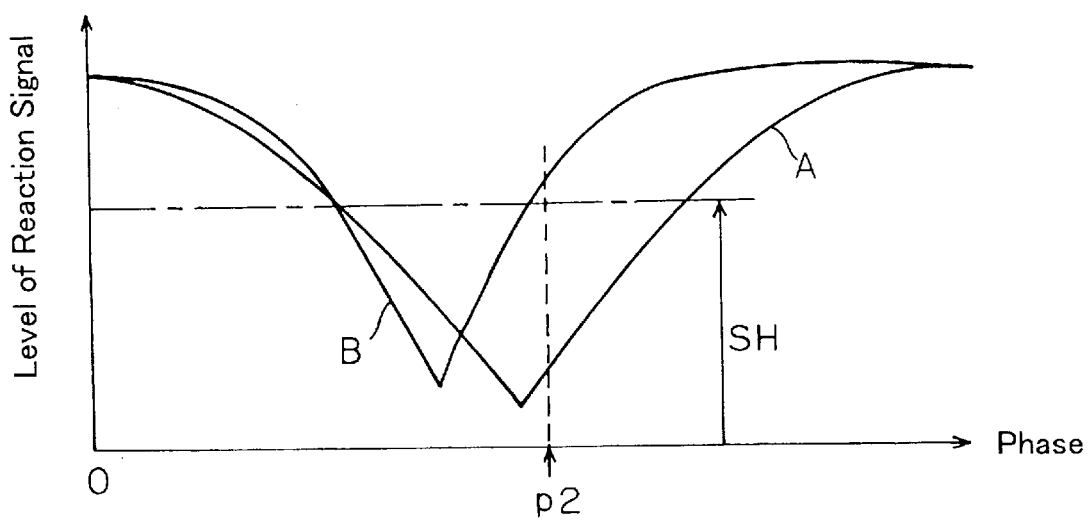
FIG. 6 is a diagram showing the phase versus output characteristic of first and second test reaction signals used for explanation of the phase determination point and the threshold value in the practice of the second preferred embodiment of the present invention.
Figure 7:
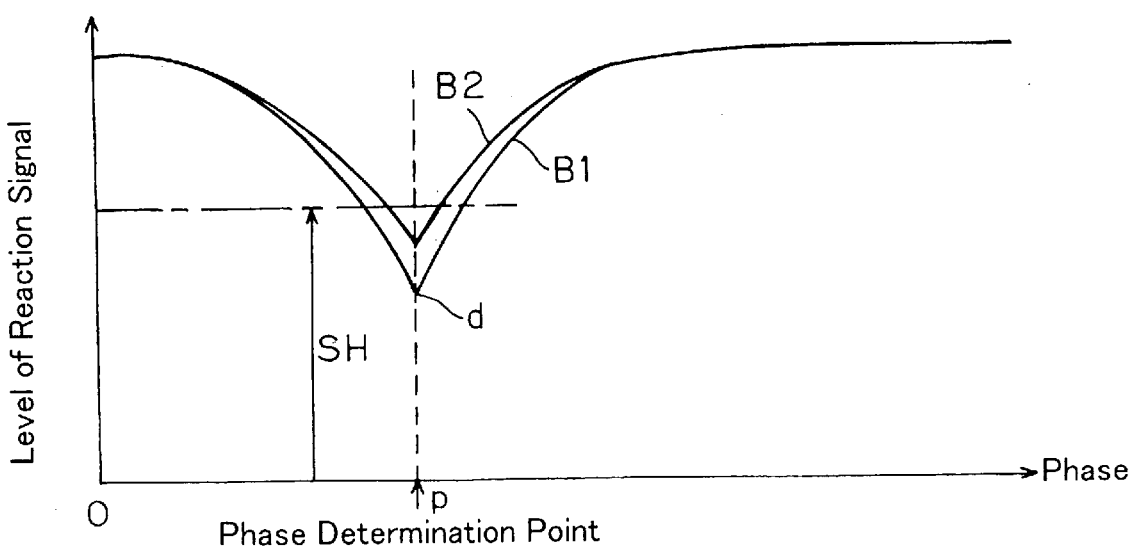
FIG. 7 is a diagram showing the phase versus output characteristic of first and second test reaction signals used for explanation of the phase determination point and the threshold value in the practice of the prior art.

FIG. 6 illustrates the relationship among the phase determination point p2 so set in the manner described above, the threshold value SH and the respective phase versus output characteristics of the first and second test reaction signals A and B.

Once the phase determining point p2 has been set in the manner described hereinabove and the detecting sensitivity of the reaction signal detecting circuit 2 has been adjusted in the manner described hereinabove, the operator has to switch the first switch 5 over to the contact b to thereby initiate the detecting operation with respect to an actual product P. At this time, the phase detector 3 provides the amplifier 4 with only a reaction signal D at the phase determination point p2, and the reaction signal D amplified by the amplifier 4 to the amplification factor a2 is subsequently supplied to the determining means 10. The determining means 10 compares the value of the reaction signal D, inputted thereto, with the threshold value SH and determines that the product P is unacceptable (containing the foreign matter) if the value of the reaction signal D is greater than the threshold value SH, but the product P is acceptable (free of the foreign matter) if the value of the reaction signal D is not greater than the threshold value SH. This result of comparison performed by the determining means 10 is displayed on the display device 11.

According to the foregoing second preferred embodiment of the present invention, merely by transporting the product added with no foreign matter and the product added with the foreign matter each one at a time by means of the conveyor C, the phase determination point p2 and the amplification factor a2 of the amplifier 4 that determines the detecting sensitivity of the reaction signal detecting circuit 2 are automatically set and, therefore, a job of setting the criterion for determination can advantageously be lessened considerably.

Also, the phase determination point p2 set in the manner described above is the phase at which the difference in level between the first and second reaction signals A and D is maximized and, therefore, the accuracy of detection of the presence or absence of the foreign matter can further be increased.

It is to be noted that even in the practice of the foregoing preferred embodiment of the present invention, the use of the first sensitivity adjusting means 12A may be dispensed with and, instead, the amplifier 4 may be employed in the form of an amplifier having its sensitivity that can be adjusted manually.

Also, in the practice of any one of the first and second embodiments of the present invention, the product added with the test piece which is foreign matter has been used to obtain the phase versus output characteristic of the first test reaction signal. However, depending on the type of the product to be inspected, it is possible to equally set the optimum phase determination point a1 or a2 by the utilization of a first test reaction signal A, obtained when only the test piece which is foreign matter is transported, and the second test reaction signal B obtained when only a product is transported.

In addition, while in the practice of any one of the first and second embodiments of the present invention the foreign matter is employed in the form of a magnetizable metal such as steel ball, a description similar to that described above can be equally applicable even where non-magnetizable metal such as aluminum is employed for the foreign matter and, in such case, similar effects can be obtained.

Yet, arrangement may be made that the prior art respective methods of setting the phase determination point and adjusting the sensitivity and the respective methods of setting the phase determination point and adjusting the sensitivity can be selectively employed depending on the type of the products to be inspected.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A method of detecting a presence or an absence of foreign matter in a product by using a reaction signal generating circuit to generate, while the product is passed through an alternating magnetic field, a reaction signal associated with the product based on the magnetic field influenced by the product, said method comprising:

obtaining a first test reaction signal by passing the product comprising a foreign matter of a minimum size to be detected, through the alternating magnetic field; and adjusting a sensitivity of the reaction signal generating circuit so that the value of the first test reaction signal at a predetermined phase point attains a desired level relative to a predetermined threshold value, wherein said predetermined phase point is a phase at which a value of a second test reaction signal obtained when the product having no foreign matter is passed through the alternating magnetic field is minimal.

2. The method of detecting the presence or absence of foreign matter as claimed in claim 1, wherein said predetermined phase point is a phase at which a difference in level between the first test reaction signal and a second test reaction signal obtained when the product having no foreign matter is passed through the alternating magnetic field is maximized.

3. An apparatus to detect the presence or absence of foreign matter in a product, the apparatus comprising:

a reaction signal generating circuit outputting a reaction signal associated with the product by detecting a change in pattern of distribution of magnetic fluxes when the product is passed through an alternating magnetic field;

a determining circuit comparing a value of the reaction signal at a predetermined phase point with a threshold value to determine the presence or absence of the foreign matter in the product;

a sensitivity adjusting unit adjusting a sensitivity of the reaction signal generating circuit so that a value of a first test reaction signal at the predetermined phase point, which is obtained when the product comprising a foreign matter of a minimum size to be detected is passed through the alternating magnetic field, attains a desired level relative to the threshold value; and a first optimum phase setting unit setting as the predetermined phase point a phase at which a value of a second test reaction signal obtained when the product having no foreign matter is passed through the alternating magnetic field is minimal.

4. The apparatus for detecting the presence or absence of foreign matter as claimed in claim 3, further comprising a second optimum phase setting unit setting as the predetermined phase point a phase at which a difference in level between the first test reaction signal and a second test reaction signal obtained when the product having no foreign matter is passed through the alternating magnetic field is maximized.

5. The apparatus for detecting the presence or absence of foreign matter as claimed in claim 3, further comprising an amplifier amplifying an output from the reaction signal generating circuit and outputting the reaction signal, wherein said sensitivity adjusting unit is operable to adjust an amplification factor of the amplifier.

* * * * *